United States Patent [19]

Tompkins et al.

[11] Patent Number: 5,616,360
[45] Date of Patent: Apr. 1, 1997

[54] METHOD FOR PROCESSING FRESH MELONS

[76] Inventors: Nicholas J. Tompkins, 193 Oak Grove La.; Tim T. Murphy, 1560 Ewing Ave., both of Arroyo Grande, Calif. 93420; Andrew T. Furukawa, 1213 Cobblestone La., Santa Maria, Calif. 93454

[21] Appl. No.: 542,178

[22] Filed: Oct. 12, 1995

[51] Int. Cl.⁶ ........................................................ A23B 7/00
[52] U.S. Cl. .................... 426/615; 426/262; 426/267; 426/268; 426/270; 426/310; 426/335; 426/541; 426/546; 426/396; 426/465; 426/482; 426/484; 426/518; 426/524
[58] Field of Search .................... 426/262, 267, 426/268, 270, 310, 324, 326, 327, 335, 541, 544, 546, 615, 654, 390, 395, 396, 419, 465, 482, 484, 518, 524, 106

[56] References Cited

U.S. PATENT DOCUMENTS

| | | | |
|---|---|---|---|
| 3,025,169 | 3/1962 | Guadagni | 426/268 |
| 3,398,001 | 8/1968 | Benson | 426/268 |
| 3,814,820 | 6/1974 | Busta et al. | 426/262 |
| 4,001,443 | 1/1977 | Dave | 426/262 X |
| 4,553,373 | 11/1985 | Viitanen et al. | 53/441 |
| 4,711,789 | 12/1987 | Orr et al. | 426/419 X |
| 4,734,324 | 3/1988 | Hill | 428/317.3 |
| 4,751,094 | 6/1988 | Orr et al. | 426/481 |
| 4,769,262 | 9/1988 | Ferrar et al. | 428/35 |
| 4,818,549 | 4/1989 | Steiner et al. | 426/267 |
| 4,879,078 | 11/1989 | Antoon, Jr. | 264/41 |
| 4,883,674 | 11/1989 | Fan | 426/419 X |
| 4,895,729 | 1/1990 | Powrie et al. | 426/316 |
| 4,910,032 | 3/1990 | Antoon, Jr. | 426/118 |
| 4,911,940 | 3/1990 | Steiner et al. | 426/262 |
| 4,923,703 | 5/1990 | Antoon, Jr. | 426/118 |
| 4,956,209 | 9/1990 | Isaka et al. | 428/35.2 |
| 5,011,698 | 4/1991 | Antoon, Jr. et al. | 426/395 |
| 5,171,593 | 12/1992 | Doyle | 426/396 X |

*Primary Examiner*—Milton Cano
*Attorney, Agent, or Firm*—Lynn & Lynn

[57] ABSTRACT

A method for processing melons provides greatly enhanced shelf life and maintains excellent quality of melon products so that they are suitable for human consumption. The harvested fresh melons are cooled to a temperature of approximately 36° F. before they are graded and selected for further processing. The melons are then cut along their apexes to form melon halves. The seeds and soft tissue are removed from the melon halves, which are then cut to form melon segments. The finds are removed from the melon segments, which are then washed in a chilled chlorinated bath. The melon segments are then inspected and graded. Those melon segments that pass the inspection and grading process are then cut to form melon cubes that are washed in a chilled chlorinated water bath. The melon cubes are drained to remove chlorinated water, and the melon cubes are washed in a chilled citric acid and tribasic calcium phosphate bath. The melon cubes are drained to remove surface moisture and then dried using dehumidified air to remove additional surface moisture. A selected weight of the melon cubes is placed into each one of a plurality of gas-impermeable containers that are subsequently sealed with a breathable film.

7 Claims, 1 Drawing Sheet

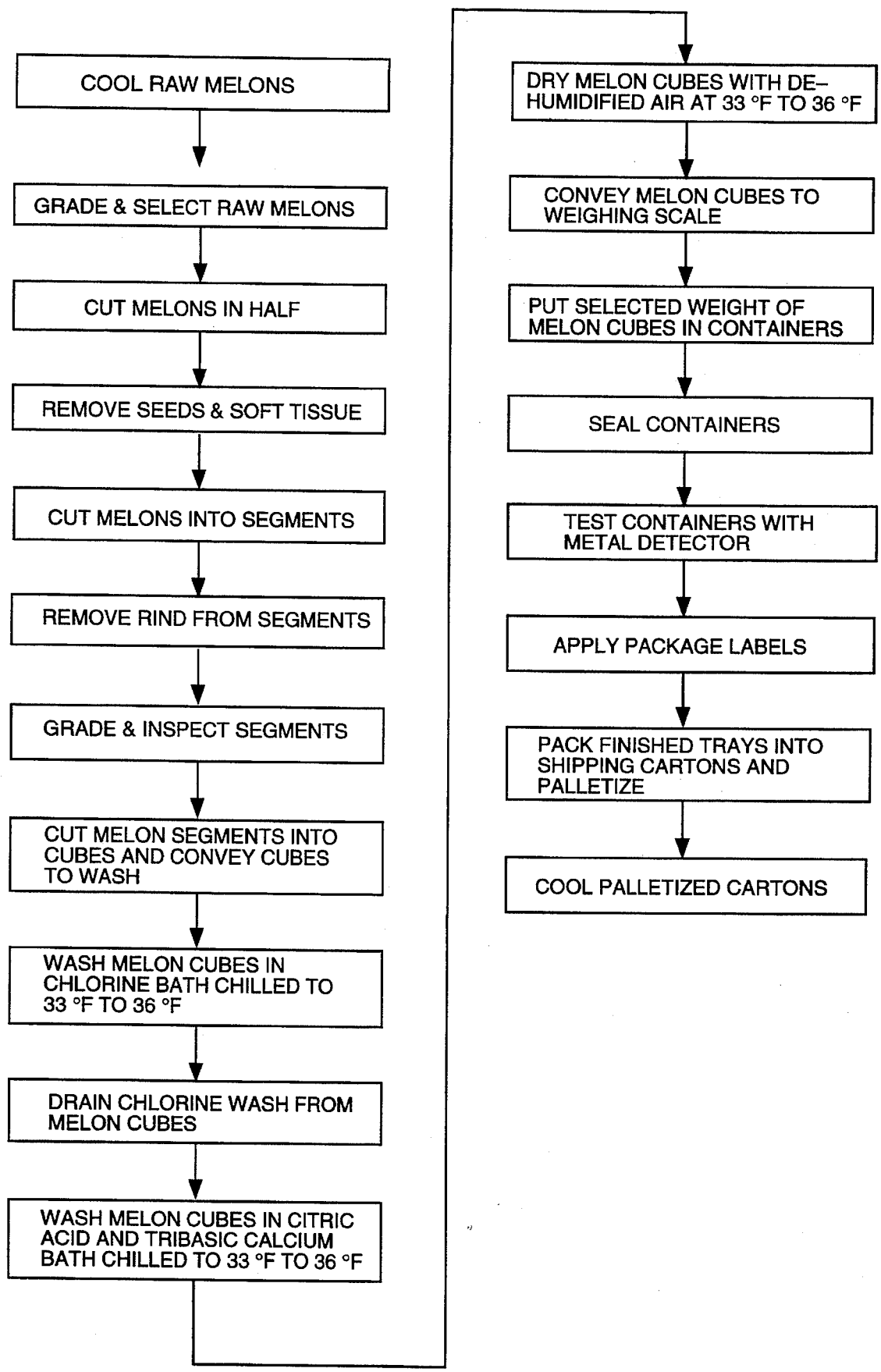

METHOD FOR PROCESSING FRESH MELONS

BACKGROUND OF THE INVENTION

This invention relates to methods for preparing and preserving fresh, ripe, edible melon pieces so that the pieces may be stored for long periods of time without appreciable loss of natural flavor, color and texture. More particularly, the method pertains to the cutting and/or segmenting of fresh edible melon tissue into pieces, packing the melon pieces in a container, sealing the container, cooling the melon pieces, and storing the container at refrigerated temperatures.

It is well-known that the quality of whole or cut fresh melons deteriorates rapidly at ambient temperatures. The deterioration rate can be slowed by maintaining the melons at refrigerated storage temperatures. Still, in most cases, the shelf-life of fresh, ripe refrigerated melon pieces is only a few days.

In addition to a temperature factor, the composition of gases in the storage atmosphere enveloping the melon can influence and prolong the storage life of whole fresh melons. There is evidence that higher carbon dioxide levels and lower oxygen levels advantageously lower the respiration and ripening rates of melons. On the negative side, however, undesirable physiological disorders and deterioration in quality of the melon may occur. In particular, strong off-flavor in the melons may develop.

Modified atmosphere packaging is the term commonly used for the storage of food in a flexible or semi-flexible bag or pouch with an internal atmosphere which is not controlled but may indeed vary in composition during storage of the commodity due to gas transmission through the walls of the bag or pouch. Plastic films have been used to cover whole melons in containers so that the atmosphere enveloping the melon can be modified. Polyethylene box liners, either sealed or unsealed, have been employed commercially for some time for the storage and transportation of apples and pears. It has been found that the respiration of the whole melon in a sealed, air containing, polyethylene bag will cause a rise in carbon dioxide level and a corresponding reduction in oxygen content in the bag interior. High levels of carbon dioxide (5% or higher) have been found to be harmful because they can cause unsightly melon discoloration and "off-flavor" development due to carbon dioxide toxicity. To reduce the risk of carbon dioxide toxicity, the bags are either unsealed or perforated to permit atmosphere exchange, or packets of fresh hydrated lime, which reacts with the carbon dioxide to reduce its level, are placed in the bag prior to sealing.

The inability to store fresh ripe melons for longer periods means that a considerable amount of fresh melon is lost due to spoilage. Thus, the development or discovery of a method to capture and retain the high quality attributes of ripe melons for prolonged storage periods would be extremely advantageous.

SUMMARY OF THE INVENTION

Accordingly, the present invention is directed to a method for processing melons that provides greatly enhanced shelf fife. The method of the present invention maintains excellent quality of melon products so that they are suitable for human consumption.

The process according to the invention includes the steps of cooling harvested raw, fresh melons to a temperature of approximately 36° F. before they are graded and selected for further processing. The melons are then cut along their apexes to form melon halves. The seeds and soft tissue are removed from the melon halves, and the melon halves are then cut to form melon segments. The rinds are removed from the melon segments, which are then washed in a chilled chlorinated bath. The melon segments are then inspected and graded. Those melon segments that pass the inspection and grading process are then cut to form melon cubes that are washed in a chilled chlorinated water bath. The melon cubes are drained to remove chlorinated water, and the melon cubes are washed in a chilled citric acid and tribasic calcium phosphate bath. The melon cubes are drained to remove surface moisture and then dried using dehumidified air to remove additional surface moisture. A selected weight of the melon cubes is placed into each one of a plurality of gas-impermeable containers that are subsequently sealed with a breathable film.

BRIEF DESCRIPTION OF THE DRAWING

The drawing is a flow chart of the method according to the invention.

DESCRIPTION OF THE PREFERRED EMBODIMENT

Referring to the Figure, raw melon product is harvested according to U.S. Department of Agriculture Grade 1 standards. Melons are preferably harvested in plastic bins rather than the conventional corrugated box. In doing so the box cost is eliminated as the plastic bin can be used repetitively. Once the melons are harvested, they are then cooled to approximate 36° F. using a forced air cooling system or a hydro cooler. Once the raw product is cooled, it should be maintained under constant refrigeration.

The cooled raw product is then placed onto a grading and inspection conveyor. The melons are graded for softness and visual cracks. Melons testing less than 3 lb. on a penetrometer should be discarded. The melons that are kept after grading and inspection are cut approximately in half lengthwise through the apex.

The melon halves are mechanically oriented to a "cup down" position on an open grid conveyor. Chilled chlorinated water jets or sprays are directed toward the seed cavity of the melon halves to remove the seeds and surrounding soft tissue. The water jets or sprays will spray water through the open grid conveyor from beneath the melon halves. Water pressure may range from 25 psi up to 100 PSI to remove the seeds and soft tissue of the cavity. Chilled chlorinated water will also be sprayed on the backside, or rind portion, of the melon halves in an effort to control bacteria. The water is cooled to approximately 34 degrees F. and chlorinated at 100 ppm. Water pH should be maintained at approximately 5.0 for effective bacteria control.

The melon halves will then be mechanically cut into segments, lengthwise of the melon, for uniformity and aesthetic reasons. The melon segments are then manually fed into a melon peeling machine that removes the rind from each melon segment. Peeled segments are then conveyed to a chilled chlorinated bath where the peeled melon segments are washed. The melon segments are then conveyed to a grading and inspection conveyor where the peeled melon segments are inspected for completeness of rind removal, seed removal, soft cavity tissue removal and bruising.

The melon segments are then manually loaded into a segment cutter which cuts the segments into cubes having sides that are of approximately one and one half inches in length.

The melon cubes are then conveyed to a chilled chlorinated bath where the melon cubes are washed in chilled chlorinated water. The water is cooled to approximately 34° F. and chlorinated at 100 ppm. Water pH should be maintained at approximately 5.0. Dwell time should be a minimum of one minute with complete submersion for effective bacteria control and continued cooling of the finished product.

The melon cubes exit the chilled chlorine bath via an open grid conveyor for drainage. The melon cubes are then washed in a chilled citric acid and calcium phosphate tribasic solution that has a temperature of approximately 34° F. and is maintained at a pH of 5.5 to 6.0. Dwell time should be a minimum of one minute with complete submersion to ensure proper coverage so as to prevent enzymatic browning. The cold citric acid and calcium phosphate tribasic solution of the solution ensures continued cooling of the product while the melon cubes are conveyed and drained via an open grid conveyor belt.

The melon cubes are then dried utilizing cold de-humidified air. The air preferably has a temperature of approximately 33° F. and a relative humidity of approximately 25% to 75%. All surface moisture should be completely removed from the melon cubes. The surface of the melon cubes should almost be dehydrated. At this point of the process, the finished product should have a core temperature not to exceed 36° F. to minimize bruising during the final packaging process.

The melon cubes are is conveyed to a weighing scale where they are apportioned by weight into rigid plastic trays. The trays are sealed with a breathable film and then individually tested with a metal detector. Packaging labels are applied to provide information about the cubed melon product, including nutritional information and UPC code. After labeling, the finished trays are packed into shipping cartons and palletized. The palletized product is force air cooled for 6 to 8 hours to enhance the equilibrium process of the modified atmosphere package.

While the present invention has been depicted and described by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. Accordingly, the depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. A method for processing fresh melons, comprising the steps of:

(a) cooling the melons to a temperature of approximately 36 degrees F.;

(b) grading and selecting the melons for further processing;

(c) forming melon halves by cutting each of the melons in half approximately through its apex;

(d) removing seeds and soft tissue from the melon halves;

(e) cutting the melons halves into melon segments;

(f) removing rinds from the melon segments;

(g) washing the peeled melon segments in a chilled chlorine bath;

(h) inspecting and grading the melon segments;

(i) cutting the melon segments to form melon cubes;

(j) washing the melon cubes in a chilled chlorinated water bath;

(k) draining the melon cubes to remove chlorinated water therefrom;

(l) washing the melon cubes in a chilled citric acid and tribasic calcium phosphate bath;

(m) draining the melon cubes to remove moisture therefrom;

(n) drying the melon cubes with dehumidified air;

(o) placing a selected weight of the melon cubes into each one of a plurality of gas-impermeable container; and (p) sealing the container with a breathable film.

2. The method of claim 1, wherein step (a) includes the step of applying forced air to the melons to provide cooling air thereto.

3. The method of claim 1 wherein step (d) includes the steps of:

(d1) arranging the melon halves so that their seed cavities are in a downward facing orientation on an open grid conveyor; and (d2) directing chilled chlorinated pressurized from 25 psi to 100 psi toward the seed cavities of the melon halves to remove the seeds and surrounding soft tissue.

4. The method of claim 1 wherein step (i) includes the steps of:

(i1) cooling the chlorinated water to approximately 34° F.;

(i2) maintaining a chlorination concentration of approximately 100 ppm;

(i3) maintaining the chlorinated water at a pH of approximately 5.0; and (i4) submersing the melon cubes in the chlorine bath for a dwell time of approximately one minute to provide bacteria control and continued cooling of the melon halves.

5. The method of claim 1 wherein step (l) includes the steps of:

(k1) maintaining the citric acid and tribasic calcium phosphate solution at a pH between 5.5 and 6.0; and (k2) maintaining the citric acid and tribasic calcium phosphate solution at a temperature between 33° F. and 36° F.; and (k3) washing each melon cube for a dwell time of at least one minute.

6. The method of claim 1 wherein step (n) includes the step of cooling the dehumidified air to a temperature of 28° F. to 30° F.

7. The method of claim 1, further including the steps of:

(n) packaging the trays into shipping cartons and palletizing the shipping cartons; and (o) forcing cool air into the palletized cartons to temperature-stabilize the packages to enhance the equilibrium process of the modified atmosphere package.

\* \* \* \* \*